May 9, 1967 D. GLASER 3,319,245

PULSE GENERATING SYSTEM

Filed Feb. 6, 1964 3 Sheets-Sheet 1

INVENTOR.
DAVID GLASER
BY Robert G. Green
ATTORNEY

INVENTOR.
DAVID GLASER
BY Robert A. Green
ATTORNEY

May 9, 1967 D. GLASER 3,319,245

PULSE GENERATING SYSTEM

Filed Feb. 6, 1964 3 Sheets-Sheet 3

INVENTOR.
DAVID GLASER

BY Robert A. Green

ATTORNEY 3,319,245
Patented May 9, 1967

3,319,245

PULSE GENERATING SYSTEM

David Glaser, Greenbrook, N.J., assignor to Burroughs Corporation, Detroit, Mich., a corporation of Michigan Filed Feb. 6, 1964, Ser. No. 342,889
9 Claims. (Cl. 340—359)

This invention relates to pulse-generating circuits and systems and, particularly, to a programmable system for generating a series of a controllable number of groups of pulses, with the number of pulses in each group being variable and controllable.

Briefly, the system of the invention includes an adjustable pulse generator module which is adapted to generate groups of variable numbers of pulses. The pulse generator module is coupled to, and is energized by, a pulse number selector module. The pulse number selector module is settable, and its setting in turn sets the pulse generator module to generate the desired number of pulses in a group. In addition to these basic modules, the system includes (1) a program means which may be used to automatically control the operation of the pulse number selector module and thus program the groups of pulses to be generated and (2) means for initiating a cycle of operation of the system.

Figure 1:
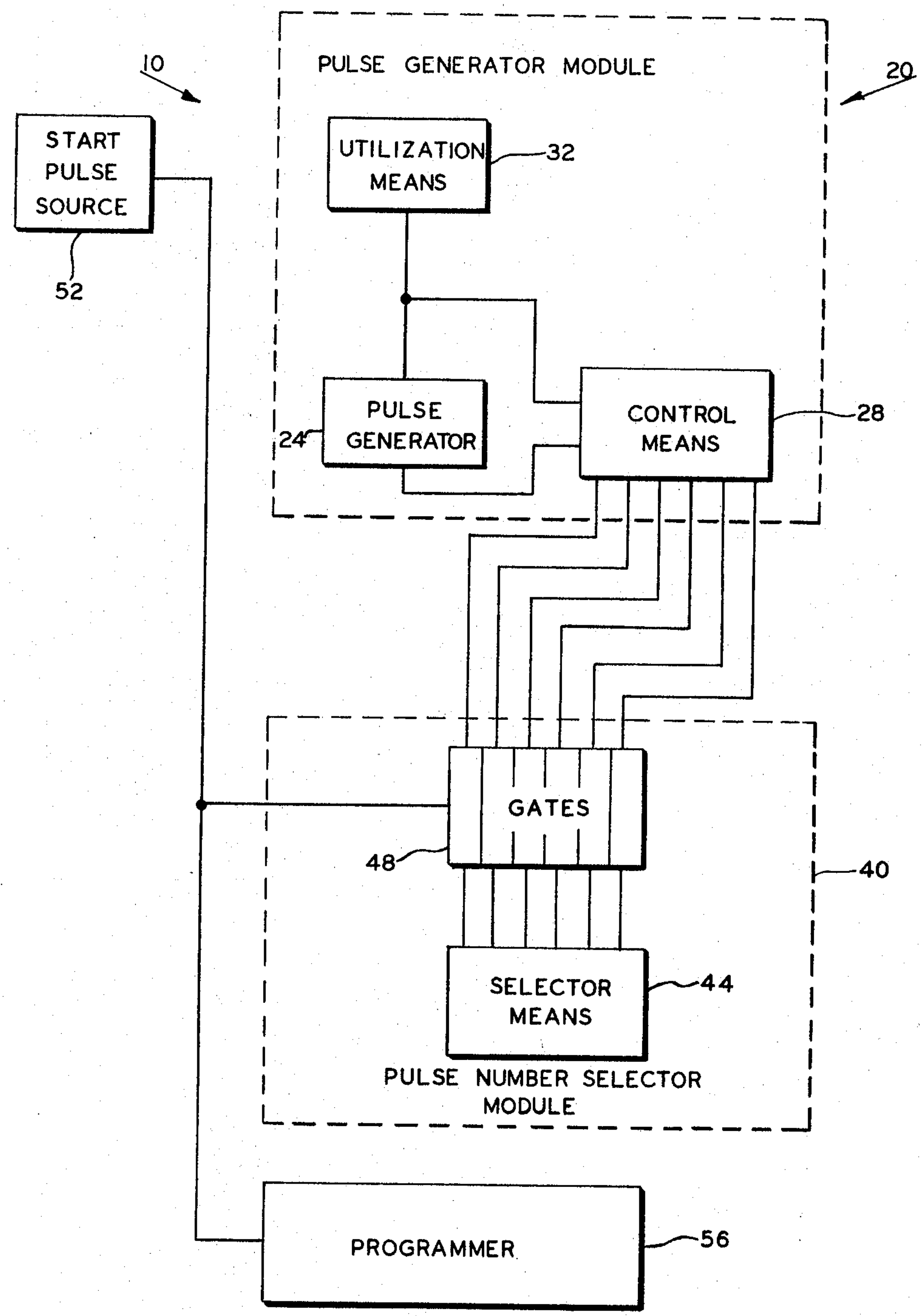
FIG. 1 is a block diagram of the system of the invention.

Referring to the block diagram of FIG. 1, a pulse generating system 10 embodying the invention includes a pulse generator module 20 which consists of a pulse generator circuit 24 and an adjustable control means 28. The control means 28 is adapted to turn on the pulse generator 24, to control the number of pulses it generates, and then to turn it off. The control means 28 and the pulse generator 24 are so related that, when the control means is turned on, it automatically turns on the pulse generator and causes it to run freely and generate pulses as it runs. As the pulse generator runs, each pulse is registered in a suitable utilization means 32 and in the control means 28. The control means 28 is adapted to disable itself and the pulse generator 24 after the desired number of pulses have been generated as determined by the setting of the control means.

The setting of the control means 28 is effected by a pulse number selector module 40 which consists of an adjustable selector means 44 and a plurality of gates 48. The gates are coupled to the control means 28 of the pulse generator module, and each gate is adapted to set the pulse generator module to generate a different number of pulses. The setting of the selector means 44 selects the proper gate for the number of pulses to be generated in a group by the generator module 20.

A source 52 of starting pulses for setting the system in operation is coupled to the gates 48, and, in operation of the system, after the desired setting of the selector means 44 and the associated gate has been made, the system remains inoperative until a start pulse is applied to the selected gate from the start pulse source 52. When the start pulse is applied to the selected gate, the control means 28 and its associated pulse generator 24 are energized and generate a group of pulses.

The system of the invention also includes program means 56 for automatically programming the pulse number selector module 40 to automatically cause a series of groups of pulses to be generated by the pulse generator module 20, with the groups of pulses containing different and controllable numbers of pulses.

The program means operates as follows. Assume that, initially, the pulse number selector means 44 is set so that the associated gate 48 causes the pulse generator module 20 to turn on and generate five pulses. Thus, each start pulse which is applied to the selected gate 48 causes five pulses to be generated by module 20. Assume that the programmer 56 is preset to change the setting of the selector means 44 after three groups of five pulses have been generated. After the required three groups of five pulses each have been produced by the application of three start pulses, the programmer 56 automatically changes the setting of the number selector means 44 and another gate 48 is energized. The new gate in turn changes the setting of the control means 28, and the control means 28 in turn causes the pulse generator 24 to generate a different number of pulses in a group. This different number of pulses is now generated with each start pulse applied and until the programmer again changes the setting of selector 44.

In a preferred embodiment of the invention, the programmer 56 is a preset decade counter, and this counter, the pulse number selector means 44, and the pulse generator control means 28 all include magnetron beam switching tubes, preferably of the type known as a Beam-X switch. This type of device is well known in the art and includes ten positions or groups of electrodes, from each of which an output pulse may be obtained. Each group of electrodes includes a target or output electrode, a spade electrode which forms and holds an electron beam on its associated target electrode, a switching electrode which may be used to switch an electron beam from one position to the next, and a shield electrode. The spade electrodes may also be employed to perform a beam switching function. A magnetron beam switching tube also includes permanent magnet means for providing a magnetic field which cooperates with the electric fields in the tube to control the movement of an electron beam therein. In the drawing, for purposes of simplification, the switching electrodes are shown schematically at one end of the tube envelope rather than in each group of electrodes. In addition, in tubes 28 and 44, only four groups of electrodes designated "0," "1," "2," "3" are shown to simplify the drawing and the description.

*Pulse generator module 20*

As described above, the pulse generator module 20 includes a control means 28, which is described herein as a multi-position beam switching tube, and a pulse generator 24, which is described herein as a multivibrator. The control beam switching tube 28 contains a cathode 66 and four groups of electrodes, each group including a target 70, spade 78, switching grid 82, and shield 86. The spade electrodes 78 are coupled through capacitors 90 to ground, and each spade is also coupled through a separate lead 92 to one of the gates 48 to be described in detail below. Each spade electrode 78 is also coupled through a load resistor 96 to a common spade bus 98 which is coupled to a portion of the gate circuit 48 to be described and to a positive D.C. power supply V1.

An auxiliary resistor 96′ is connected in parallel with the spade load resistor 96 at the last position in tube 28, the "3" position. The combination of resistors 96 and 96′ has such a value that an electron beam cannot be supported at the "3" position, and, when an electron beam reaches this position during the execution of a counting cycle, the beam is cleared and the counting cycle is completed.

It is well known that there are many ways to switch an electron beam from position to position in a magnetron beam switching tube. Such switching can be achieved by applying switching potentials to the switching grid electrodes, to the spade electrodes, or to the target electrodes. In the embodiment of the invention shown in FIG. 2, target switching is employed and the multivibrator 24 and beam switching tube 28 are so connected that each complete cycle of the multivibrator, that is each two changes of state, causes the beam to move by one position in tube 28 and enters one count in the utilization device which may be a mechanical counter or any other suitable device. For purposes of description, a mechanical counter is shown.

The target or output electrodes 70 of tube 28 are connected in sets, with the electrodes at the even-numbered positions being connected in one set and to a bus 102 and the electrodes at the odd-numbered positions being connected in a set and to a bus 106. One end of the bus 102 is coupled through a resistive path to the switching electrodes 82 at the even-numbered positions, and one end of the bus 106 is connected through a resistive path to the switching electrodes 82′ at the odd-numbered positions. The other end of each bus 102 and 106 is connected through a capacitor 110 to ground.

The cathode 66 of tube 28 is connected through a parallel combination of resistor 115 and capacitor 116 to ground. Cathode 66 is also coupled to multivibrator 24 in a manner to be described below. The shield electrodes 86 are connected to a suitable positive D.C. power source V2.

The multivibrator 24 may be of generally conventional form and may be made up of two transistors or two tubes, as desired. In the drawing, the multivibrator is shown as comprising two tubes 118 and 120 having cathodes 122 and 124, control grids 128 and 130, and anodes 134 and 136, respectively. The cathode electrodes 122 and 124 are connected together and through a resistor 140 to ground, and the anodes and control grids are capacitively cross-connected. The anode 134 is connected through a resistive path and through the solenoid of mechanical relay 32 to a bus 144 which is coupled to a D.C. power source V3. The anode 134 is also connected through a portion of its resistive load path and through capacitors 148 to the even-numbered and odd-numbered switching electrodes 82 and 82′ of tube 28. Each set of switching electrodes is also connected through a resistive path to ground. The anode 136 of tube 120 is coupled through a resistive path to the bus 144. The control grid 130 is coupled through a resistive path to the bus 144 and through a diode 150, oriented as shown, and a suitable resistor 154 to ground. The cathode of diode 150 is coupled through lead 156 to the output of start pulse source 52. The control grid 128 is connected through resistor 158 and lead 160 to the cathode 66 of tube 28.

The operation of the pulse generator module 20 is as follows. The module 20 is adjusted so that initially the beam switching tube 28 does not have an electron beam formed therein, and, in the multivibrator, tube 118 is off and tube 120 is on. This condition is maintained in part by the application of ground potential from the cathode 66 of tube 28 through lead 160 to the grid 128 of tube 118 of the multivibrator. When a start pulse is provided from source 52 and the system is set in operation, a negative pulse is applied from one of the gates 48, in a manner to be described, to one of the spade electrodes 78 in tube 28, say the "0" spade, that is the spade at the "0" position. This pulse applied to the "0" spade causes an electron beam to flow from the cathode 66 to the "0" position, and the cathode 66 rises in potential to a positive level which is transmitted through lead 160 to the grid 128 of tube 118 of the multivibrator. The multivibrator is now rendered operative and runs freely in known fashion. With each cycle of operation of the multivibrator, and, particularly, each time that tube 118 turns on, a count is registered in counter 32 and the beam is moved by one position in the beam switching tube 28.

When finally the electron beam reaches the last position or position "3" in tube 28, the beam is cleared due to the action of the spade resistors 96 and 96′. When the electron beam is thus cleared, the cathode 66 of tube 28 drops to about ground potential, and this potential transmitted through lead 160 to the grid 128 of tube 118 again disables the multivibrator, and the initial conditions are restored in which tube 120 is on and tube 118 is off. Thus, one cycle of operation is completed.

In the next cycle of operation, if it is desired to provide a different number of output pulses, then the electron beam is set at some position other than the "0" position in tube 28. After the beam has thus been set at the desired position, the required number of pulses is generated in the manner described above.

Figure 2:
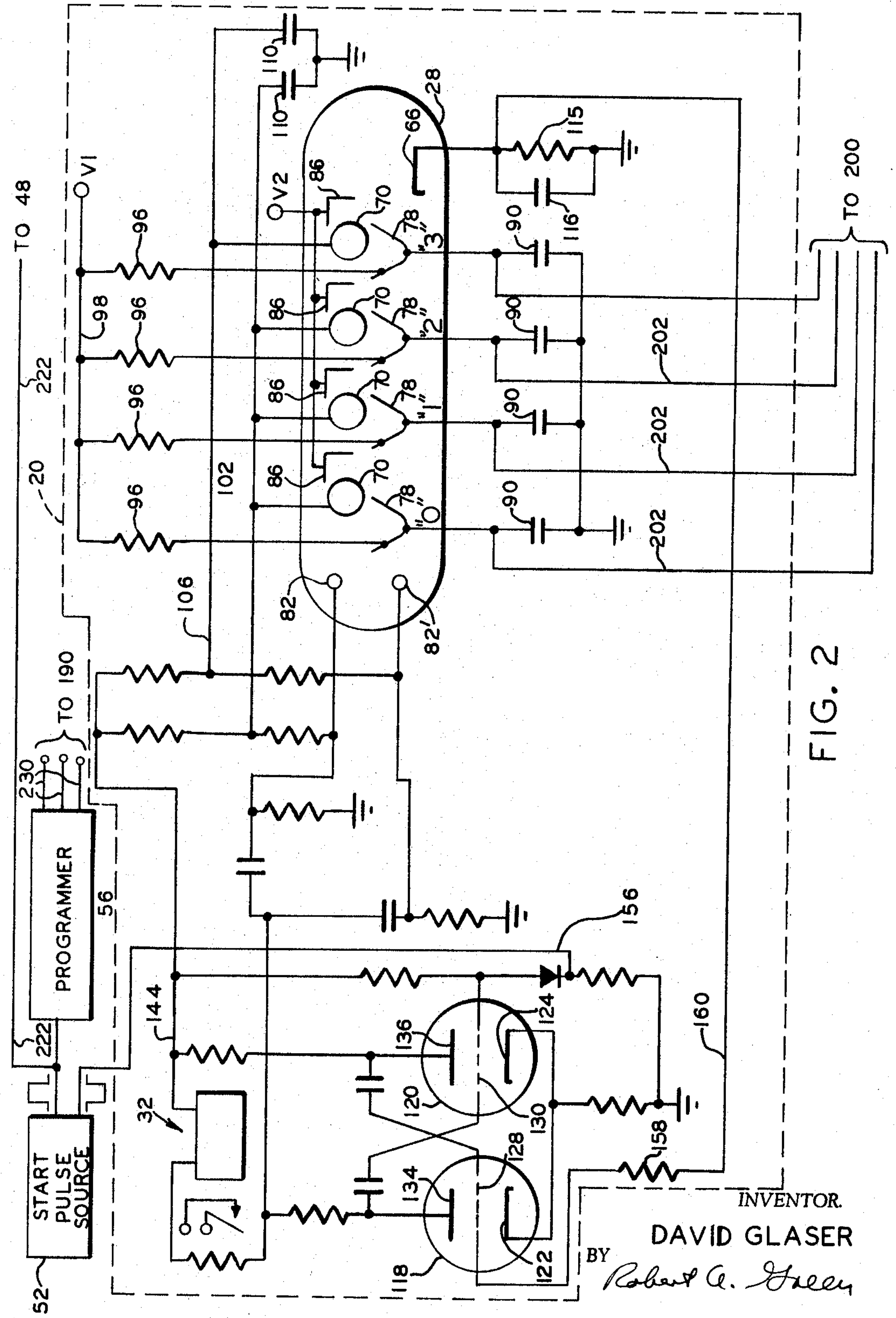
FIG. 2 is a schematic representation of a circuit diagram of a portion of the block diagram system of FIG. 1.
Figure 3:
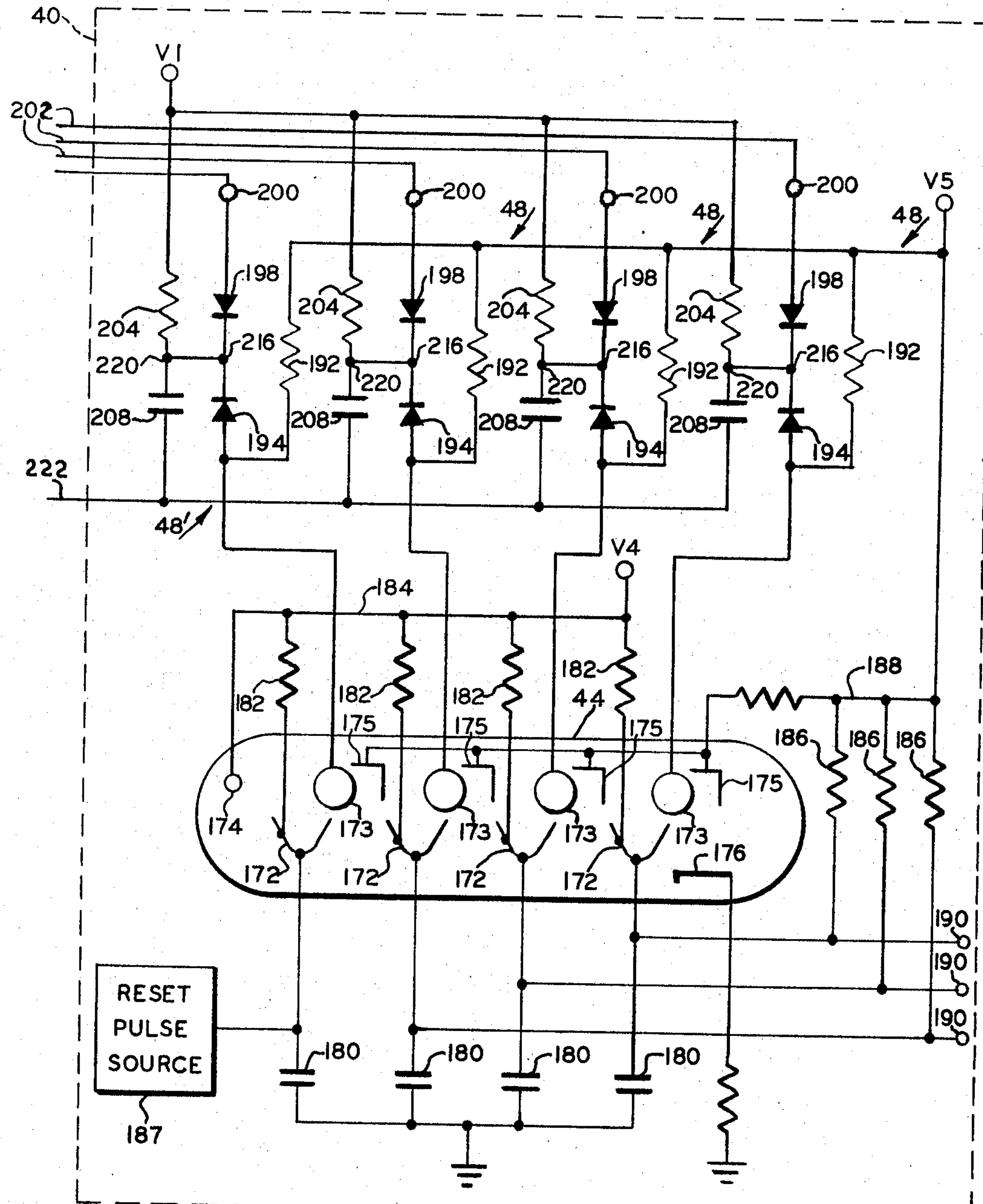
FIG. 3 is a schematic representation of the circuit which makes up the remainder of the block diagram of FIG. 1.

It is to be noted that normally in the operation of a beam switching tube such as tube 28 in a circuit such as that shown in FIG. 2, a beam is cleared automatically when the beam enters the last position in the tube, i.e., the multivibrator does not provide a pulse which clears the beam from this last position. Thus, in the circuit of FIG. 2, the multivibrator provides one count less than the number of positions in tube 28. An additional count can be obtained, if desired, by means of the connection of the start pulse source 52 through lead 156 and diode 150 to grid 130 of tube 120. A negative pulse is taken from source 52 and is applied to tube 120 and causes the multivibrator to change state and thus register a count in the relay 32. When the start pulse is removed and before a beam is formed in the tube 28 to cause the pulse generator module 20 to execute a pulse generating cycle, the multivibrator returns to its normal condition in which tube 118 is off and tube 120 is on. This arrangement for obtaining an extra count from the start pulse source may be used, if desired, and may be omitted if it is not required.

*Pulse number selector module 40*

In the pulse number selector module 40, the selector means 44 comprises a magnetron beam switching tube in which each group of electrodes includes a spade electrode 172, a target electrode 173, a switching electrode 174, and a shield electrode 175. The tube 44 also includes an electron-emitting cathode 176.

Each spade electrode of the selector tube 44 is coupled through a capacitor 180 to ground and through a load resistor 182 to a bus 184. The bus 184 is coupled to all of the switching grids 174 and to a positive D.C. power source V4. The "0" spade, that is the spade at the "0" position, is coupled to the output of a source 187 of reset pulses, and each of the other spades is coupled through a capacitor 158 and bias resistor 186 to a bus 188 which is connected to a positive D.C. power source V5. The junction of each resistor 186 and capacitor 185 is connected to a terminal 190 which is adapted to be coupled to programming means 56, for a purpose to be described. The shield electrodes 175 are connected together and through a suitable resistive path to bus 188.

Referring to the gates 48, one gate is provided for each group of electrodes in the selector tube 44. Each gate includes a target load resistor 192, a pair of cathode-to-cathode connected diodes 194 and 198, oriented as shown, and a resistor-capacitor circuit 203 including a series-connected resistor 204 and capacitor 208. In the circuits 203, the free end of each resistor 204 is connected to power source V1, and the free end of each capacitor 208 is connected to a bus 212 which is coupled through lead 222 to start pulse source 52. The junction point 216 of each pair of diodes 194 and 198 is connected to the junction point 220 of one of the circuits 203. Each target electrode 173 in tube 44 is connected through a load resistor 192 to power source V5. Each target is also connected to the anode of diode 194, and the anode of each diode 198 is provided with a terminal 200. Each terminal 200 is adapted to be coupled through a jumper lead 202 to one of the spade electrodes of tube 28, as required by the program to be followed. In the drawing, the "0" target of tube 44 is coupled to the "0" spade of tube 28, the "1" target of tube 44 is coupled to the "1" spade of tube 28, etc. However, these connections are merely illustrative. For example, the terminal 200 coupled to the "0" target of tube 44 may or may not be coupled to the "0" spade of tube 28. In addition, the terminal 200 coupled to the "1" target in tube 44 may be connected to the "1" spade of tube 28, or it may be connected to any other spade. This feature of the invention will be described below in connection with a description of the operation of the entire system.

In the embodiment of the invention shown, the switching electrodes 174 in tube 44 are not used to perform a beam switching function in the selector tube 44 and, thus, are connected together and to bus 184 whereby a common operating potential is applied thereto. The cathode 176 of tube 44 is connected through a suitable resistive path to ground.

The operation of the pulse number selector module 40 is as follows. With power supply V1 about 70 volts and power supply V5 about 200 volts, the other circuit parameters are selected so that in each gate 48, the anode of diode 194 is at about +190 volts, the junction 216 of the diodes is at about +190 volts, and the anode of diode 198 is at about +70 volts. If a beam is present on one of the targets of tube 44, say the "0" target, then, referring to the gate 48' coupled to this target, the anode of diode 194 is at about +8 volts and the junction point 216 is now at about +70 volts and the anode of diode 198 is at about +70 volts. It can be seen that diode 198 is now "primed" and can be readily biased in the forward direction by the application of a negative potential at the junction 216.

Assuming that the first group of pulses to be generated by generator module 20 is to include four pulses, then a jumper lead 202 is connected as shown from the terminal 200 of gate 48' connected to the "0" target 173 in tube 44 to the "0" spade of control tube 28. Also, an electron beam is formed at the "0" position in tube 44 by the application of a negative pulse from source 187 to the "0" spade of tube 44. A start pulse which is a positive step wave is then applied from source 52 through lead 222 to the bus 212 which is connected to all of the circuits 203 and all of the gates 48. The positive step wave is differentiated by the circuits 203 to provide positive and negative spikes of about 100 volts each at the junctions 216 of the diodes 194 and 198 of each of the gates 48. The positive spike at each gate has no effect on the gates, and the negative spike has no effect on any of the gates except the gate 48' coupled to the "0" target of tube 44. At this gate, the negative spike reduces the junction point 216 to about ground potential, and this potential is coupled through diode 198 and lead 202 to the "0" spade of tube 28. The potential thus applied to this "0" spade causes an electron beam to form at the "0" position in tube 28, the multivibrator 24 is energized, and a counting or pulse generating cycle is executed as described above. The tube 28 causes three pulses to be generated, and the fourth pulse is generated through the application of a separate start pulse on lead 156 to multivibrator 24.

When this cycle is completed, although the pulse generator module 20 is disabled, the pulse number selector tube 44 still has an electron beam formed at its "0" position and the gate 48' associated therewith is in an active state as described above. Thus, if another group of four pulses is required, a start pulse is again applied from source 52, and again a beam is formed at the "0" position in tube 28, and a pulse generating or counting cycle is executed to produce four pulses as above.

Assuming that the next group of pulses is to have a different number of pulses, for example, three, then an electron beam is switched to another position, for example, the "1" position, in tube 44, and the terminal 200 of the gate 48 associated therewith is coupled to the appropriate position in tube 28, in this case the "1" position, for generating a cycle of three pulses. With the system thus set, the next start pulse applied to the gates 48 causes a beam to form at the required position in tube 28, and the required cycle of three pulses is generated. Any number of groups of three pulses may be generated as required. If it is then desired to change the number of pulses generated, the beam in tube 44 is switched to another position which is coupled through its gate 48 to the required position in tube 28.

*Programmer*

The program means 56 which may be used to control the automatic generation of a series of groups of different numbers of pulses may be a preset counter or the like or any other suitable apparatus, of which many are known. Because such apparatus is well known, it need not be shown in detail. The program means might include a ten-position beam switching tube of the type described above with its input coupled to the start pulse source 52 and with each output position connected to a presettable switch having ten outputs not shown but represented by output leads 230. Each position in the counter which represents a specific number of counts can be connected by its lead 230 to a terminal 190 coupled to a selected position in tube 44. Thus, the preset switch may be set so that after the counter has received two counts, representing two groups of pulses generated by the system 10, a signal appears on the appropriate output lead 230 and moves the electron beam in tube 44 to another position to cause the generation of a different number of pulses in a group by generator module 20. Similarly, the preset switch may be further set so that after, say, eight counts have been entered in the counter, representing eight groups of pulses generated by the system, another signal appears on the appropriate output lead 230 to change the setting of the beam in tube 44 and to change the number of pulses to be generated by generator module 20.

*The start pulse source*

The start pulse source 52, like the program means, may be any one of many well known circuits which are capable of providing the pulses required for operating the system 10. For the system shown and described above, a generally negative step wave is required for application through lead 156 and diode 150 to tube 120 to register one count in addition to those subsequently registered by the operation of the pulse generator module 20. In addition, the start pulse source 52 must provide a generally positive step wave for application through lead 222 to the gates 48. One suitable circuit for use as start pulse source 52 is a one-shot multivibrator which may comprise two tubes or two transistors, or the like, suitably connected to provide the desired operation. Since such circuits are well known, the source 52 is not shown or described in detail.

*Operation of system 10*

For purposes of clarifying the operation of the system 10, one complete cycle of operation will now be described. Assuming that four pulses are to be generated, initially, there is no beam present in tube 28 and a beam is set at the "0" position in tube 44. The presence of an electron beam at the "0" position in tube 44 primes the gate 48' which is coupled to the "0" target of tube 44. Next, the start pulse source 52 is energized, a count is entered in the program means 56, and both negative and positive output pulses are provided thereby for application to other portions of the system. The negative output pulse activates the multivibrator 24 to register one count, and the positive output pulse thereof is coupled through lead 222 to the gates 48. The start pulse opens only gate 48' and causes a negative pulse to be applied to the "0" spade in tube 28. This causes an electron beam to form at the "0" position. When the beam is thus formed at tube 28, the multivibrator is turned on and caused to run freely and to generate pulses. With each pulse generated, the beam in tube 28 is moved by one position until it reaches the "3" position, at which time the beam is automatically extinguished and the multivibrator is automatically disabled. This represents the end of one cycle of operation. Other cycles and the execution of a present program may be executed as described above.

It is to be understood that many modifications may be made in the system 10 described below. For example, each of the portions of the circuit which may utilize beam switching tubes might substitute ring counters or any other suitable type of counter for the beam switching tube. In addition, referring to the control tube 28 in pulse generator module 20, if the tube 28 has a sufficient number of positions for the largest number of pulses to be generated in a group, then it may not be necessary to use the method of obtaining an extra pulse by coupling the start pulse source through diode 150 to the multivibrator 24.

Also, with respect to the selector tube 44, it will be clear to those skilled in the art that the program control means 56 which applies beam-forming pulses to the tube may be coupled to the switching electrodes, rather than to the spade electrodes as shown.

It is also to be understood that the gates having terminals 200 need not be connected sequentially to the groups of electrodes in tube 28. Thus, the terminal 200 coupled to the "0" target in tube 44 need not be coupled to the "0" spade in tube 28, and the terminal 200 coupled to the "1" target in tube 44 need not be coupled to the "1" spade in tube 28. If desired, for example, the terminal 200 of the "0" target may be coupled to the "0" spade in tube 28, and the terminal 200 coupled to the "1" target may be coupled to the "2" or "3" spade in tube 28. Also, more than one terminal 200 can be connected to the same spade electrode in tube 28.

Those skilled in the art will also appreciate that the start pulse source may be any suitable pulse generator other than a one-shot multivibrator, and the program control means 56 may be any other suitable circuit than the preset counter.

What is claimed is:

1. A system for generating variable groups of pulses including:

an oscillator which is adapted to be either in an inactive state or in a free-running state with its state being controlled by the application thereto of an enabling potential or a disabling potential, a counter-register adapted to be in an inactive state or in an active state and having a plurality of count-registering positions connected in series and including a first position, a plurality of intermediate positions and a last position, said counter-register including means for initiating operation thereof at any of its positions, said oscillator and said counter-register being coupled together so that their active and inactive states occur at the same time, a current flow path at each position of said counter-register with current flow occurring only during the performance of a counting operation and only at a position which is registering a count, a first connection from each current flow path to said oscillator whereby said enabling potential or said disabling potential is coupled from each current flow path in said counter-register to said oscillator, and a second connection from said oscillator to each position in said counter-register for causing the counting operation to proceed from a starting position to said last position, at which time both said oscillator and said counter-register are rendered inactive.

2. The system defined in claim 1 wherein said counter-register includes a circuit arrangement for rendering itself inactive and stopping current flow therein after its last position registers a count, whereby said oscillator is also rendered inactive.

3. The system defined in claim 1 and including a multi-position register coupled to said counter-register for selecting the position at which the operation thereof is to be initiated.

4. The system defined in claim 1 and including a second multi-position register having each position thereof coupled to a position in said counter-register for selecting the position at which the operation of the counter-register is to be initiated, said second multi-position register including means for selecting its operating position and thereby selecting the position to be used as a starting position in said counter-register.

5. The system defined in claim 4 and including an input pulse source and a decade counter having an output lead from each of its counting positions, said input pulse source being coupled both to said decade counter for registering each input pulse therein and to circuit means for initiating operation of said counter register and said oscillator whereby a plurality of pulses are generated thereby with each input pulse, and circuit means coupled between said output leads of said decade counter and said second multi-position register whereby selected ones of said leads can be connected to selected positions in said second register so that as the accumulated count in said decade counter reaches each of said selected output leads, a different position in said second register is selected to control said counter-register, and, in turn, a different position in said counter-register is selected as the starting point for a pulse-generating cycle.

6. The system defined in claim 1 wherein said counter-register comprises a magnetron beam switching tube which includes an electron-emitting cathode and a plurality of groups of electrodes in operative relation therewith whereby an electron beam can flow from said cathode to each of said groups of electrodes, in turn, and said oscillator includes a control electrode which is coupled to said cathode in said beam switching tube whereby the state of operation of said oscillator is controlled by the presence or absence of an electron beam flowing from said cathode to one of said groups of electrodes in said beam switching tube.

7. The system defined in claim 3 wherein said counter-register comprises a first magnetron beam switching tube which includes an electron-emitting cathode and a plurality of groups of electrodes in operative relation therewith whereby an electron beam can flow from said cathode to each of said groups of electrodes in turn, and said oscillator includes a control electrode which is coupled to said electron-emitting cathode in said beam switching tube whereby the state of operation of said oscillator is controlled by the presence or absence of an electron beam flowing from said cathode to one of said groups of electrodes in said beam switching tube, and said multi-position register comprises a second magnetron beam switching tube including an electron-emitting cathode and a plurality of groups of electrodes, each group of electrodes in said second beam switching tube being coupled to and controlling the operation of a group of electrodes in said first beam switching tube.

8. The system defined in claim 7 wherein the positions in said second beam switching tube are coupled through a plurality of gates to the positions in said first beam switching tube.

9. The system defined in claim 7 wherein the positions in said second beam switching tube are coupled through a plurality of gates to the positions in said first beam switching tube, and an input signal source is coupled to said gates for opening a selected gate and initiating operation of said oscillator and first beam switching tube.

References Cited by the Examiner

UNITED STATES PATENTS

| | | | |
|---|---|---|---|
| 2,373,134 | 4/1945 | Massonneau | 340—359 |
| 2,403,873 | 7/1946 | Mumma | 340—359 |
| 2,607,891 | 8/1952 | Townsend | 340—359 |
| 2,810,122 | 10/1957 | Lanning | 340—359 |

NEIL C. READ, *Primary Examiner.*

THOMAS B. HABECKER, *Examiner.*